Jan. 4, 1966 K. M. REED 3,227,408
SOAKER HOSE CLAMP AND SUPPORT
Filed Sept. 11, 1964
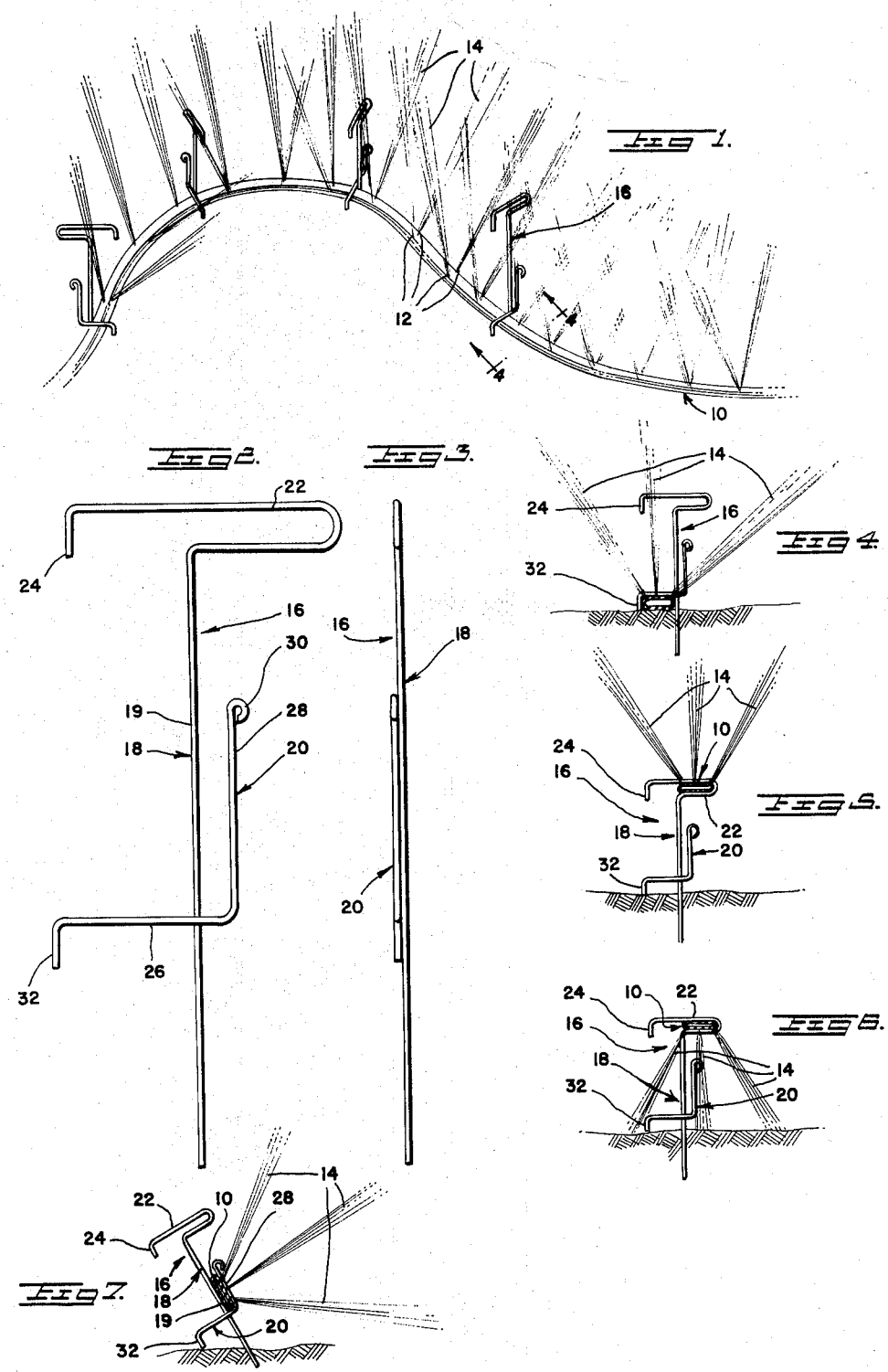

United States Patent Office 3,227,408
Patented Jan. 4, 1966

3,227,408
SOAKER HOSE CLAMP AND SUPPORT
Kenneth M. Reed, 1005 S. Providence Road,
Chester, Pa.
Filed Sept. 11, 1964, Ser. No. 395,737
3 Claims. (Cl. 248—87)

This invention relates to a device for holding soaking hoses in various preferred positions when watering a lawn or garden, and more particularly it relates to a hose clamp and support used for this purpose.

In recent years soaking hoses have become increasingly popular for watering large sections of lawn with a fine spray without inundating the lawn as might the full blast of an unattended ordinary hose nozzle. These soaking hoses have surplanted mechanical sprinklers to a large extent since they are inobstrusive, much less expensive, and also because one soaking hose, properly laid out, can cover an area with spray usually larger than can a single hose, even with a sprinkler attachment. Furthermore there is no extensive upkeep with a soaking hose since there are no moving parts. Tears or leaks can be easily fixed but the low price of these hoses makes repairs really unnecessary.

The soaking hose of this discussion consists of a flexible plastic tube of flattened cross section with a large number of small holes through one side along the length thereof. When the hose is placed with its contiguous side down, water under pressure applied at one end, and the other end being blocked off, issues from the multitude of holes as if they were nozzles. The adaptability of the soaking hose, which has enhanced its household acceptance, is sometimes the cause of the biggest problem. Hoses of this type are very prone to twisting and kinking. The twisting of a portion will either direct the water into a different direction than desired or will cause the holes to be in juxtaposition with the soft ground and completely blocked. Kinking of the hose, on the other hand, may block off the water partially or completely from the downstream sections and cause the water to issue from the upstream sections at too high a pressure. Although, while laying out the hose on the ground, it may retain its intended position, the water pressure when applied can cause twists to show up. Furthermore, from the normal position of the soaking hose, on the ground, on a flat side, the water cannot be directed across a very large area.

The present application is directed to an improved type of hose clamp and support which may be used with a soaking hose to overcome the above discussed disadvantages.

An object of the present invention is to provide a hose clamp and support capable of preventing kinking and twisting of the hose.

Another object of the invention is to provide a hose clamp and support for raising the soaking hose above ground level for soaking a large area.

Still another object of the invention is to provide a hose clamp and support for carrying a soaking hose in a tilted position, above ground level in order to direct the water in a particular direction.

A further object of the invention is to provide a hose clamp and support for permitting the watering of the ground directly adjacent to and beneath the soaking hose.

These and other objects and advantages of the invention will become apparent from the following description when taken in conjunction with the accompanying drawings. It will be understood, however, that the drawings are for the purposes of illustration and are not to be construed as defining the scope and spirit of the invention, reference being made for the latter purpose, to the claims appended hereto.

In the drawings, wherein like reference characters denote like parts in the several views:

FIG. 1 is pictorial view illustrating a number of hose clamp and support members of the invention holding a soaking hose in a desired position on the ground;

FIG. 2 is a front elevational view of the hose clamp and support of the present invention;

FIG. 3 is a side elevational view of the hose clamp and support of FIG. 2;

FIG. 4 is a cross sectional view, taken along lines 4—4 of FIG. 1, of one of the hose clamp and support members holding the soaking hose against the ground with the water spray directed upward and angled to the left and to the right.

FIG. 5 is a cross sectional view of the hose clamp and support member holding the soaking hose at a distance above the ground and spraying upwardly, to the left, and to the right.

FIG. 6 is a cross sectional view of a hose clamp and support member with the soaking hose held as in FIG. 4, although inverted, so that the water sprays downwardly, to the left, and to the right.

FIG. 7 is a cross sectional view of the hose clamp and support member showing the soaking hose being held so as to spray out to one side only.

Reference is now made to FIG. 1, which illustrates a soaking hose, generally designated 10, having a number of holes 12 for emitting a water spray 14. The hose is held clamped to the ground by a hose clamp and support member, generally designated 16, to prevent the hose from twisting and kinking as well as moving from the predetermined position.

Looking to FIGS. 2 and 3, the hose clamp and support member 16 is made up of a pair of stiff elements 18 and 20, preferably wire such as is used in coat hangers. The element 18 has a straight, ground engaging portion 19 and a U shaped upper section 22 integral therewith, the upper free end 24 of the U being bent downwardly across the opening thereof.

The cooperating element 20 is welded across the ground engaging element 18 at a point on section 26 thereof, perpendicular to the ground engaging portion 19 of the element 18 as seen in FIG. 2. At one side of the horizontal portion 26 there is an integral upwardly extending portion 28 of the element 20 which ends in a curved over lip 30. The far side of the horizontal portion 26 has a downwardly depending end 32.

As shown in FIGS. 1 and 4 the soaking hose 10 may be held flat against the ground by the hose clamp and support 16, the lower end of the ground engaging portion 19 being driven into the ground with the horizontal section 26 and depending end 32 of the cooperating element, as well as a portion of the element 18 abutting the top and sides of the hose 10, serving to hold the hose 10 in place both from sideways and up or down movement.

If it is desired that the spray be extended over a much larger area the hose may be mounted in the clamp as shown in FIG. 5. In this instance the hose is forced into the U shaped section 22 at the upper end of the hose clamp and support 16 with the holes 12 of the soaking hose 10 extending in an upwardly and outwardly direction. The legs of the U 22 are spaced slightly closer together than the normal width of the hose 10 so that the hose is held tightly in place within the U 22 preventing its accidental disengagement. This will allow the hose not only to wet the ground adjacent thereto but to cover a large area which when the use of a ground engaging hose might necessitate the use of two or three hoses.

As shown in FIG. 6 the hose may be inserted into the U 22 in an inverted position so that the holes 12 now lie at the lower face of the hose 10 thereby permitting the spray to be more concentrated in a particular area than would be possible with the hose 10 laying on the ground.

In FIG. 7 there is shown a fourth position for holding the hose 10 in the hose clamp and support member 16 in which the hose 10 is held between the ground engaging portion 19 of the element 18 and the upwardly extending leg 28 of the cooperating element 20 which together form a U similar to the U shaped portion 22 formed at the top of the ground engaging leg 18.

In this position the hose clamp and support member 16 may be driven straight down into the ground or tilted slightly, as shown in the illustration FIG. 7, to permit the water spray 14 to be directed to one side of the hose if such is desired.

In each of the arrangements shown the downwardly depending portion 32 of the element 20 acts to help brace the hose clamp support 16 against the ground in conjunction with the portion 19 of the element 18 which is actually inserted into the ground. The downwardly depending portion 24 of the element 18 also serves a purpose in that it shields the sharp edge of the outer end of the loop 22 from possibly piercing the hand of a user when driving the device 16 into the ground. In this regard, the loop 22 itself serves as a broad handle for downpressing the tubular end into the ground and also may be used to pull the hose clamp and support 16 back out of the ground. The rounded end 30 of the element 20 is also a safety feature for preventing an accidental and painful injury if the user's hand should slip from the U shaped section 22 when driving the device 16 into the ground.

Hose clamps and support devices of this type may be used singly or in combination depending upon the desired function. When using a long soaking hose 10, as shown in FIG. 1, to water a lawn or yard it is desirable to place the hose clamps along the hose every 4 to 6 feet to prevent too much play in the hose. If it is desirable to do so a number of hose clamp and support means 16 may be utilized as shown, in the different views 4, 5, 6 and 7, along the same hose so as to water close to the hose, away from the hose, to the side, or directly down from the hose in different parts of the lawn or yard.

This hose clamp or support device 16 is easily constructed of two pieces of still metal wire bent to form the shapes of elements 18 and 20 and connected by means of a weld. A plastic or rubber coating is preferably applied to prevent rusting and to keep a neat and clean looking finish although the device may be utilized without such coating.

The entire device 16 could also be constructed of a single piece of molded plastic or even of wood, although in this instance it would be necessary to make the elements slightly thicker than those shown for purposes of illustration.

While I have described the specific hose clamp and supporting mechanism of the invention, it will be apparent that this arrangement is not restricted in use to holding down only a soaking hose but may be used in a similar fashion with an ordinary hose particularly adjacent the nozzle thereof.

Having now described my invention in detail in accordance with the requirements of the patent statutes, those skilled in the art will have no difficulty making changes or modifications in the individual parts or their relative dimensions. Such changes and modifications may be made without departing from the scope and spirit of the invention as set forth in the following claims.

I claim:

1. A soaking hose clamp and support comprising a first substantially vertical rod element, a first U shaped hose clamping section having a long leg and short leg, the short leg of said first hose clamping section being connected perpendicularly by the outer end thereof, to the upper end of said first rod element, the long leg of said first U shaped hose clamping section extending directly over said short leg and said first rod element and having a downwardly depending terminal portion on the outer end thereof; a second cooperating rod element rigidly fixed to said first rod element by a horizontal section thereof between the ends of said first rod element; an upwardly extending vertical section formed on one end of the horizontal section of said second rod element and spaced from said first rod element a distance substantially equal to the distance between said legs of the first U shaped hose clamping section to form a second substantially U shaped hose clamping section with the adjacent portion of the first rod element, the upper terminal end of said upwardly extending section being bent back on itself to form a blunt end, a vertical downwardly depending terminal end formed on the end of said horizontal section of said second rod opposite the upwardly extending section to form a third hose clamping section in cooperation with the horizontal section of said second rod element and the adjacent portion of the vertical first rod element.

2. A soaking hose clamp and support comprising a first substantially vertical rod element, a second cooperating rod element rigidly fixed to said first rod element by a horizontal section thereof between the ends of said first rod element, an upwardly extending vertical section formed on one end of the horizontal section of said second rod element and spaced from said first rod element to form a substantially U shaped first hose clamping section, a vertical downwardly depending terminal end formed on the end of said horizontal section opposite said upwardly extending section to form a second hose clamping section in cooperation with the horizontal section of said second rod element and the adjacent portion of the vertical rod element.

3. A soaking hose clamp and support as recited in claim 2 wherein there is a third hose clamping section comprising a U shaped section having parallel legs formed at one end of said vertical rod element said U shaped section being adapted to tightly grip a soaking hose between the legs thereof and to form a handle for gripping the hose clamp and support when inserting or removing it from the ground.

References Cited by the Examiner

UNITED STATES PATENTS

| | | | |
|---|---|---|---|
| 282,183 | 7/1883 | Fletcher | 131—257 |
| 854,178 | 5/1907 | Ruff | 248—87 |
| 1,479,943 | 1/1924 | Thompson | 248—88 |
| 2,425,893 | 8/1947 | Molitor | 248—87 |
| 2,954,194 | 9/1960 | Alfano | 248—75 |

CLAUDE A. LE ROY, *Primary Examiner.*

J. F. FOSS, *Examiner.*